Patented Mar. 17, 1925.

1,529,704

UNITED STATES PATENT OFFICE.

WALTER KROPP, OF ELBERFELD, GERMANY, ASSIGNOR TO FARBENFABRIKEN VORM. FRIEDR. BAYER AND CO., OF LEVERKUSEN, NEAR COLOGNE-ON-THE-RHINE, GERMANY.

3-METHYL-4-ISOPROPYLPHENOL-ORTHO-CARBOXYLIC ACID USEFUL AS AN ANTIRHEUMATIC AND ANALGETIC.

No Drawing.   Application filed June 3, 1924. Serial No. 717,647.

*To all whom it may concern:*

Be it known that I, WALTER KROPP, a citizen of Germany, residing at Elberfeld, in the State of Prussia, Germany, have invented new and useful Improvements in 3-Methyl-4-Isopropylphenol-Ortho-Carboxylic Acid Useful as an Antirheumatic and Analgetic, of which the following is a specification.

The present invention concerns the production of the hitherto unknown 3-methyl-4-isopropylphenol-ortho-carboxylic acid having most probably the following formula:

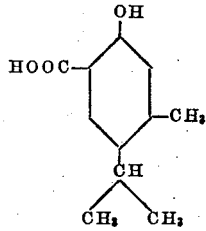

For the production of my new compound the 3-methyl-4-isopropylphenol is converted into the carboxylic acid according to Kolbe's method by treating it with caustic soda and $CO_2$.

The new product crystallizes from benzene in the shape of needles melting at 189–190° C. Its alcoholic solution is colored blue by ferric chloride. It has proved to be a valuable antirheumatic and analgetic; an average dose being from ¼ to ½ gram. It forms salts with metals e. g. with sodium or calcium. These salts retain the valuable therapeutic properties exhibited by the free acids.

In order to illustrate the invention more fully, the following example is given, the parts being by weight:

Dissolve 11 parts of sodium hydroxide in 10 parts of water and add thereto by and by 45 parts of 3-methyl-4-isopropylphenol. The mixture is stirred and heated until it is nearly dry and can be pulverized. The powdered product is then heated during two hours to 140° C., and at this temperature a current of dry nitrogen or hydrogen is passed over it. It is then allowed to cool to 110° and at this temperature a stream of dry carbon dioxide is passed during several hours over the mass which has to be stirred.

In the course of several hours the temperature is raised to 200° C. and kept at this point. After cooling the resulting product is pulverized and treated with water and a sodium carbonate solution. It is filtered and the filtrate is acidulated. The product is redissolved in a sodium carbonate solution and precipitated again.

The sodium salt of the new acid can be obtained by dissolving it in the calculated quantity of normal caustic soda solution and evaporation. It is easily soluble in water.

I claim:—

The herein described 3-methyl-4-isopropylphenol-ortho-carboxylic acid having most probably the formula:

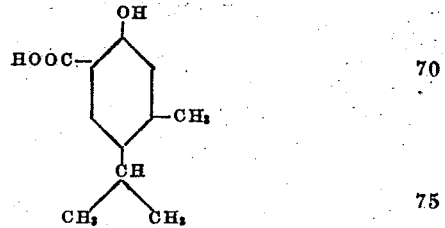

crystallizing from benzene in the shape of needles melting at 189–190° C.; yielding in alcoholic solution a blue coloration with ferric chloride; being a valuable antirheumatic and analgetic; forming salts with metals which salts retain the valuable therapeutic properties of the free acid; the sodium salt being easily soluble in water.

In testimony whereof I have hereunto set my hand.

WALTER KROPP.